(12) United States Patent
Oh

(10) Patent No.: US 8,152,913 B2
(45) Date of Patent: Apr. 10, 2012

(54) DUST COLLECTING APPARATUS FOR COMPRESSING DUST

(75) Inventor: Jang-keun Oh, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 290 days.

(21) Appl. No.: 12/641,736

(22) Filed: Dec. 18, 2009

(65) Prior Publication Data

US 2010/0206173 A1 Aug. 19, 2010

Related U.S. Application Data

(60) Provisional application No. 61/152,770, filed on Feb. 16, 2009.

(30) Foreign Application Priority Data

Mar. 31, 2009 (KR) .................. 10-2009-0027778

(51) Int. Cl.
*B01D 45/12* (2006.01)
(52) U.S. Cl. ............. 96/424; 55/429; 55/433; 55/459.1; 55/DIG. 3
(58) Field of Classification Search .................. 96/424; 55/429, 432, 433, 459.1, DIG. 3
See application file for complete search history.

(56) References Cited

U.S. PATENT DOCUMENTS

| 4,363,156 A | 12/1982 | Leinfelt |
| 6,625,845 B2 | 9/2003 | Matsumoto et al. |
| 2008/0263816 A1 | 10/2008 | Oh et al. |
| 2008/0264011 A1 | 10/2008 | Oh et al. |
| 2008/0264014 A1 | 10/2008 | Oh et al. |
| 2008/0264015 A1 | 10/2008 | Oh et al. |
| 2008/0264016 A1 | 10/2008 | Oh et al. |

FOREIGN PATENT DOCUMENTS

| JP | 54-103262 | 8/1979 |
| JP | 08-000514 | 1/1996 |
| JP | 2002051950 A * | 2/2002 |
| JP | 2003-190056 | 7/2003 |
| JP | 2005-058787 | 3/2005 |
| KR | 1020060031442 | 4/2006 |
| KR | 100853332 | 8/2008 |
| KR | 1020080105536 | 12/2008 |

* cited by examiner

*Primary Examiner* — Robert A Hopkins
(74) *Attorney, Agent, or Firm* — NSIP Law

(57) ABSTRACT

A dust collecting apparatus for compressing dust is provided. The dust collecting apparatus for compressing dust may include a centrifugal dust separating device having a dust outlet, a compressing device formed inside the dust receptacle, and including a compressing plate in which a dust inlet is formed, and a dust passage forming member forming a dust passage between the dust outlet and the dust inlet.

13 Claims, 4 Drawing Sheets

DUST COLLECTING APPARATUS FOR COMPRESSING DUST

CROSS-REFERENCE TO RELATED APPLICATIONS

This application claims benefit under 35 U.S.C. §119(e) from U.S. Provisional Application No. 61/152,770, filed Feb. 16, 2009, in the United States Patent and Trademark Office, and under 35 U.S.C. §119(a) of a Korean Patent Application No. 10-2009-0027778, filed on Mar. 31, 2009, in the Korean Intellectual Property Office, the entire disclosures of which are incorporated herein by reference for all purposes.

BACKGROUND

1. Field

The following description relates to a dust collecting apparatus, and more particularly, to a dust collecting apparatus capable of compressing dust collected in a dust receptacle.

2. Description of the Related Art

Centrifugal vacuum cleaners (or 'cyclone cleaners'), have been widely used. These cleaners employ dust receptacles instead of disposable dust bags, and therefore address the problems of conventional vacuum cleaners, i.e., the problems of inconvenience and cost arising from frequent replacing of the dust bags. Such a cyclone cleaner may separate dust particles from a gas stream, which may be entered into the cleaner by negative pressure, using a cyclone, and collects the separated dust particles in a dust receptacle.

However, the users of the cyclone cleaners still have to empty the dust receptacles whenever the receptacles are full.

In order to address the inconvenience arising from the emptying of the dust receptacles, a new type of cyclone cleaner has been developed, which is capable of compressing collected dust and therefore providing an increased dust capacity.

FIG. 1 is a longitudinal cross section view, illustrating an example of a conventional dust collecting apparatus compressing dust, mainly disclosed in Korean Patent No. 10-606794, entitled 'Cyclone dust collecting apparatus' (also referred to as 'conventional apparatus').

A conventional cyclone dust collecting apparatus may include a first body 120 which separates dust particles from an air stream introduced through a first inlet 110, a first outlet 140 having a plurality of holes 141, a pressing plate 210 having a foreign substance discharging hole 211, a dust receptacle 130 formed below the pressing plate 210, a compressing portion 200 having a recovering member 230, a spring protective portion 240, and a plunger 250. The conventional cyclone dust collecting apparatus may compress the foreign substances collected in the dust receptacle 130 using the pressing plate 210, thereby reducing the size of the foreign substance and increasing the dust capacity of the dust receptacle 130. Therefore, the user of the conventional dust collecting apparatus may empty the dust receptacle 130 less frequently.

However, in the conventional apparatus explained above, some foreign substances may not be removed after being separated in the first body 120. As a result, the foreign substances may accumulate on the upper surface of the pressing plate 210, resulting in deteriorated efficiency of dust separation. Furthermore, dust accumulated on the upper surface of the pressing plate 210 may flow backward through the first outlet 140, causing blockage of the holes 141. As a result, the user may need to clean the upper surface of the pressing plate 210 and the holes 141 periodically, in order to avoid dust backflow and deteriorated dust separation efficiency.

A larger foreign substance discharging hole 211 may be adapted in an attempt to reduce the amount of dust piled on the upper surface of the pressing plate 210. However, this may cause an increased amount of dust in the dust receptacle 130 to scatter in the circular air stream and flow backward through the first outlet 140. Additionally, a larger foreign substance discharging hole may result in deteriorated efficiency of dust compression by the pressing plate.

SUMMARY

In one general aspect, there is provided a dust collecting apparatus for compressing dust. The dust collecting apparatus may include a centrifugal dust separating device having a dust outlet, a compressing device formed inside a dust receptacle, and including a compressing plate in which a dust inlet is formed, and a dust passage forming member forming a dust passage between the dust outlet and the dust inlet.

The dust passage forming member may include an extensible and retractable tube.

The dust passage forming member may include an extensible and retractable corrugate tube.

The dust passage forming member may separate the dust passage from an interior space of the dust receptacle so that dust does not flow into the interior space.

An interior space of the centrifugal dust separating device may be separated from an interior space of the dust receptacle, and connected fluidly to a dust receiving portion of the dust receptacle device through the dust outlet.

The compressing device may further include a moveable member to move the compressing plate, and one end of the moveable member may be rotatably secured to the centrifugal dust separating device.

The dust receptacle may include a dust discharge cover to move between a position to open a lower portion of the dust receptacle and a position to close the lower portion of the dust receptacle.

The moveable member may include a screw shaft.

The dust collecting apparatus may further include a driving device to provide the compressing device with a driving force to move upward and downward. The dust collecting apparatus may be part of a vacuum cleaner.

The driving device may be controlled to move the compressing plate upward and downward during an operation of the vacuum cleaner at least one of: continuously, at predetermined intervals, and according to a user selection.

The driving device may be controlled to move the compressing plate upward and downward if a power line of the vacuum cleaner is connected to an external power terminal.

The driving device may be controlled to move the compressing plate upward and downward between when the vacuum cleaner stops operation and when a power line of the vacuum cleaner is disconnected from an external power terminal.

The driving device may be controlled to move the compressing plate upward and downward if the power line of a vacuum cleaner is connected to an external power terminal, to stop moving the compressing plate upward and downward if an operating switch of the vacuum cleaner is turned on, and to move the compressing plate upward and downward if the operating switch is turned off or the power line is disconnected from the external power terminal.

In another aspect, a dust collecting apparatus in a vacuum cleaner is provided. The dust collecting apparatus may include a centrifugal dust separating device, a dust receptacle, a compressing device including a compressing plate, a first dust passage forming member, and a driving device. The dust receptacle may include an interior space and a dust receiving portion, the interior space and the dust receiving portion separated by the compressing plate. The centrifugal dust separating device may fluidly communicate with the dust receptacle through the first dust passage forming member and the first dust passage member may extend through the interior space.

The centrifugal dust separating device may include a dust outlet, and the compression plate may include a dust inlet, the first dust passage forming member may be positioned between the dust outlet and dust inlet. The first dust passage forming member may separates the dust inlet and dust outlet from the interior space.

The compressing device may further a moveable member, the compressing plate movable in opposite directions by the moveable member, and the moveable member driven by the driving device.

The moveable member may extend though the dust receptacle.

The moveable member may be separated from dust receiving portion by a second dust passage forming member.

Other features and aspects will be apparent from the following detailed description, the drawings and the claims.

Figure 1:
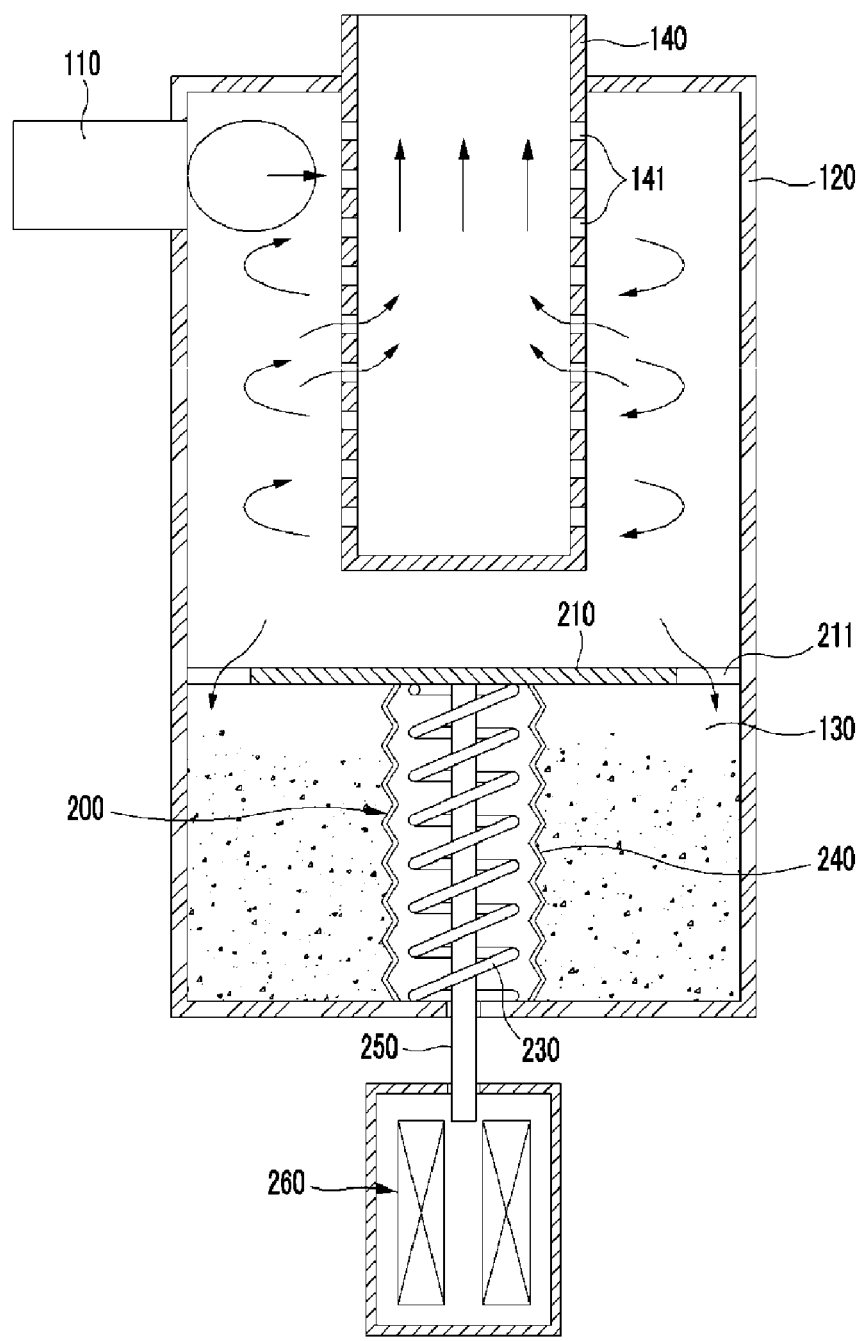
FIG. 1 is a longitudinal cross section view of a conventional dust collecting apparatus capable of compressing dust.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

Figure 2:
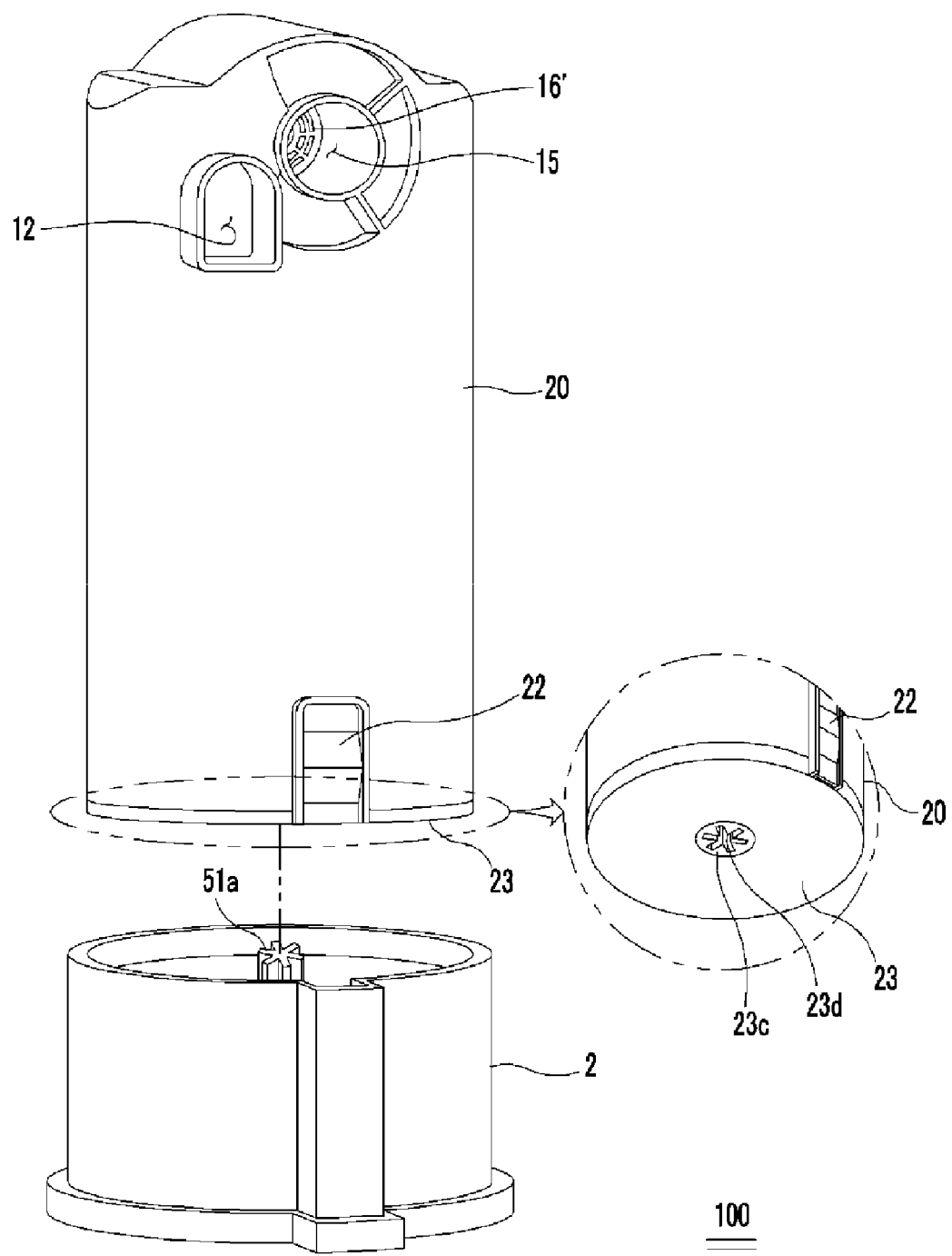
FIG. 2 is an exploded perspective view of an exemplary dust collecting apparatus capable of compressing dust.
Figure 3:
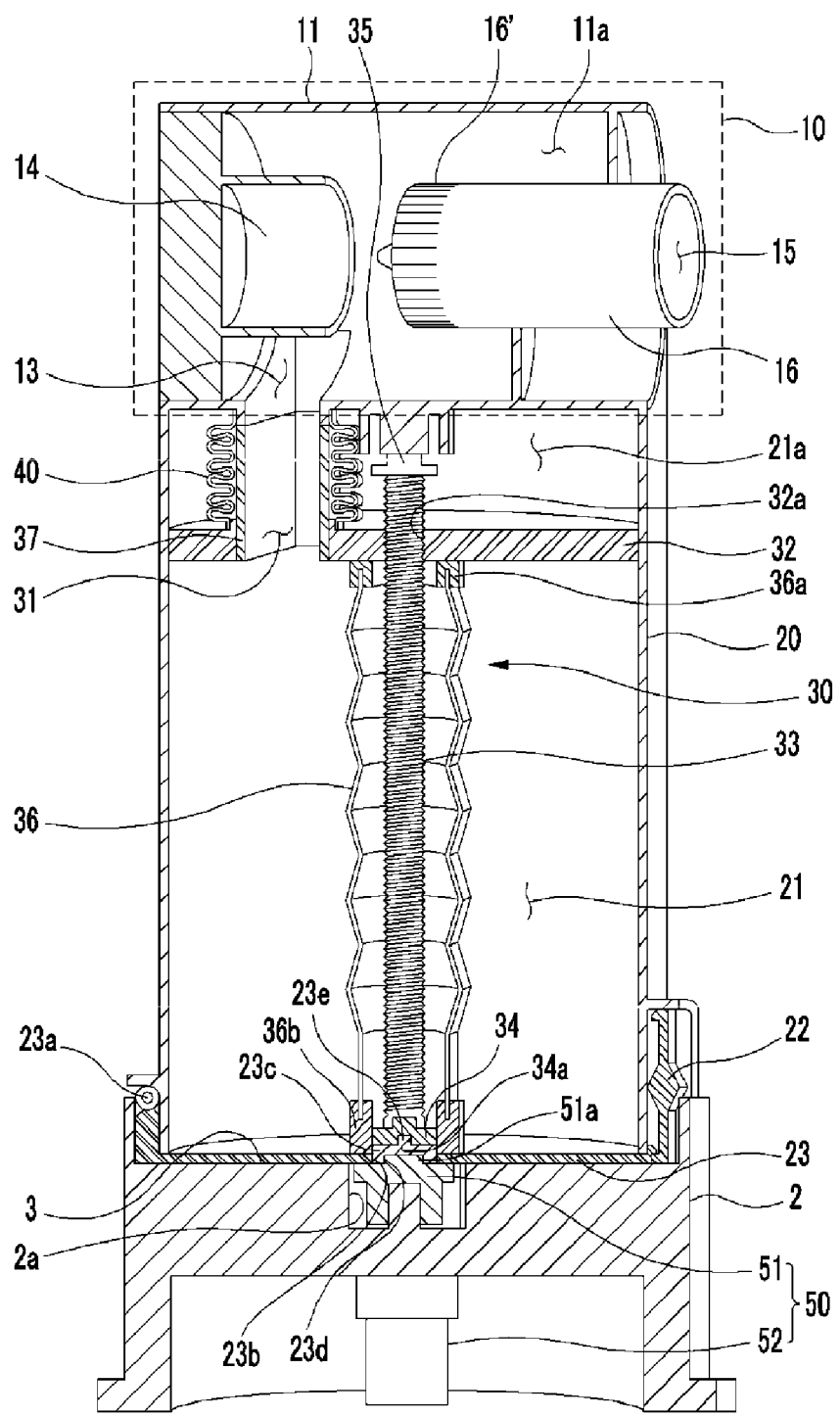
FIG. 3 is a cross section view of an exemplary dust collecting apparatus in one state.

FIG. 2 is an exploded perspective view of an exemplary dust collecting apparatus 100 capable of compressing dust. FIG. 3 is a cross section view of an exemplary dust collecting apparatus in one state, taken along a perpendicular plane crossing a center of an air discharge port 15, illustrating a situation in which a dust receptacle 20 of FIG. 2 is seated on a dust receptacle seating portion 3 and connected to a motor casing 2.

Referring to FIGS. 2 and 3, the exemplary dust collecting apparatus 100 capable of compressing dust may include a centrifugal dust separating device 10, a dust receptacle 20, a compressing device 30, a first dust passage forming member 40, and a driving device 50.

The centrifugal dust separating device 10 may take the form of a horizontal tube, and include a centrifugal separating tube 11 which has an inlet 12 formed in an outer surface and in fluid communication with the outside of the dust receptacle 20 to draw in external air, and a dust outlet 13 through which dust is discharged after being separated from the spinning air stream. The centrifugal separating tube 11 may include a guide pipe 14 and a discharge air guiding tube 16 formed on one and other inner sides of the centrifugal separating tube 11. A grill 16' having a plurality of holes may be formed on an end of the discharge air guiding tube 16 which may be placed inside the centrifugal separating tube 11. A discharge port 15 to discharge cleaned air may be formed on the other end which is open and placed outside of the centrifugal separating tube 11. The centrifugal dust separating device 10 with the above-explained construction may be placed in a horizontal direction in the upper inner portion of the dust receptacle 20 so that the dust outlet 13 faces downward direction. As a result, an interior space 11a of the centrifugal dust separating device 10 may be separated from an interior space 21a of the dust receptacle 20, and fluidly communicated with a dust receiving portion 21 via a dust inlet 31.

The dust receptacle 20 may be in a cylindrical form, which may include the dust receiving portion 21 formed therein to receive dust, a lower open portion, and an opening and closing lever 22 formed on an outer circumference of the lower portion to secure a dust discharge cover 23 in place. The dust discharge cover 23 may be formed on the lower open portion of the dust receptacle 20, in which one end may be connected by a hinge 23a to the lower portion of the dust receptacle 20, and the other end may be opened and closed by the opening and closing lever 22. The centrifugal dust separating device 10 may be formed above the dust receptacle 20. The centrifugal dust separating device 10 may be formed independently and connected to the dust receptacle 20, or alternatively, the centrifugal dust separating device 10 and the dust receptacle 20 may be formed integrally with each other.

The dust discharge cover 23 may be employed to open or close the lower open portion of the dust receptacle 20, and may include a second coupler receiving hole 23b formed in the center. Accordingly, a second coupler 23c to be connected to the first coupler 34 connected to the lower portion of a moveable member 33, may be inserted and rotatably secured in the second coupler receiving hole 23b. The second coupler 23c may include a second coupler protrusion 23e formed on an upper surface to be inserted in the first coupler recess 34a, and a second coupler recess 23d may be formed in a lower surface to receive an axis coupling member protrusion 51a of an axis coupling member 51. According to the construction explained above, if the dust discharge cover 23 is closed, the first coupler 34 may be connected to the second coupler 23c, and thereby the driving power of the driving device 50 may be transmitted to the moveable member 33. The first coupler 34 connected to the lower end of the moveable member 33 may be separated from the second coupler 23c if the dust discharge cover 23 is opened.

The compressing device 30 may include a compressing plate 32 which may compress dust collected in the dust receiving portion 21, the moveable member 33 which may move the compressing plate 32 in an upward or downward direction, and a second dust passage forming member 36 which may be extended from a lower surface of the compressing plate 32 to the lower end of the moveable member 33 and house the moveable member 33 therein.

The dust inlet 31 may be formed on a surface of the compressing plate 32 that faces the dust outlet 13 of the centrifugal dust separating device 10, to receive dust therethrough. A rib 37 may protrude from an upper outer circumference of the dust inlet 31 to be connected to an outer circumference of the lower open portion of the first dust passage forming member 40. An axis coupling hole 32a having a female screw thread, for example, formed on an inner circumference, may be formed on a center of the compressing plate 32 so that the moveable member 33 may be passed through and screw-coupled with the axis coupling hole 32a.

The moveable member 33 may be engaged with the axis coupling hole 32a of the compressing plate 32, to move the compressing plate 32 upward or downward in accordance with the direction of rotation. In order to move the compressing plate 32 upward or downward, the moveable member 33 may be formed in a ball screw configuration, for example, having a male screw thread formed on an outer circumference of the portions that correspond to the destinations of the upward and downward movements of the compressing plate 32. The first coupler 34 may be securely connected to the lower end of the moveable member 33 to be connected to the second coupler 23c which may be rotatably connected to the dust discharge cover 23.

The first coupler recess 34a may be recessed to receive the second coupler protrusion 23e, and may be formed on a lower surface of the first coupler 34. Accordingly, the moveable member 33, with the above-explained construction, may be positioned inside the dust receptacle 20, in a manner in which an upper end may be rotatably secured to the lower surface of the centrifugal dust separating device 10, or to a rotatable fixing member 35, such as a bearing, for example, which may be secured to an interior of the dust receptacle 20.

The second dust passage forming member 36 may be formed as an extensible corrugate tube having upper and lower open ends. The outer circumference of the second dust passage forming member 36 may be secured in place by a first gasket 36a, which may be in a annular shape and attached to a lower outer circumference of the axis coupling hole 32a of the compressing plate 32, and a second gasket 36b to which the first coupler 34 may be rotatably connected through the intervention of, for example, a rotatable bearing member or the like, which may be formed on the outer circumference of the first coupler 34 at the lower end of the moveable member 33. As a result, the second dust passage forming member 36 may securely enclose a portion of the moveable member 33 which may be placed in the dust receptacle 21, to thereby prevent or limit dust collected in the dust receptacle 21 from attaching to the moveable member 33.

The first dust passage forming member 40 may be formed in an extensible corrugate tube having upper and lower open ends. The outer circumference of the upper open portion of the first dust passage forming member 40 may be connected to the centrifugal dust separating device 10 in a manner in which the dust outlet 13 of the centrifugal dust separating device 10 may be placed inside, and the outer circumference of the lower open portion may be connected to the compressing plate 32 in a manner in which the dust inlet 31 of the compressing plate 32 may be placed inside. As a result, the first dust passage forming member 40 may form a passage for dust to move between the dust outlet 13 and the dust inlet 31. The dust passage formed by the first dust passage forming member 40 may allow all the separated dust to be collected to the dust receptacle 21 through the dust outlet 13 of the centrifugal dust separating device 10, while preventing or limiting diffusion of dust to the other areas such as interior space 21a, for example, of the dust receptacle 20.

The driving device 50 may include the axis coupling member 51 connected to a motor shaft, and a motor 52 housed in the motor casing 2 in an arrangement in which a rotational axis is co-axial with respect to the moveable member 33. The axis coupling member 51 may include the axis coupling member protrusion 51a extended radially from the upper central surface and inserted in the second coupler recess 23d. The axis coupling member 51 with the above-explained construction may be exposed at an upper portion of the motor casing 2 through an axis coupling member hole 2a formed on the upper central portion of the motor casing 2, so that the axis coupling member protrusion 51a may be inserted in and engaged with the second coupler recess 23d of the second coupler 23c when the dust receptacle 20 is seated on the dust receptacle seating portion 3 of the motor casing 2.

The centrifugal dust separating device 10, the dust receptacle 20, the compressing device 30, and the first dust passage forming member 40 may be formed integrally with each other, and seated on the dust receptacle seating portion 3 formed at the upper portion of the motor casing 2 to be connected to the motor casing 2. In such a situation, as the axis coupling member protrusion 51a of the axis coupling member 51, which may be exposed at the upper portion through the axis coupling member hole 2a of the motor casing 2, may be inserted in and engaged with the second coupler recess 23d of the second coupler 23c which is rotatably connected to lower portion of the dust discharge cover 23, the rotatable driving power of the motor 52 may be transmitted to the moveable member 33 via the second coupler 23c, and the first coupler 34.

Figure 4:
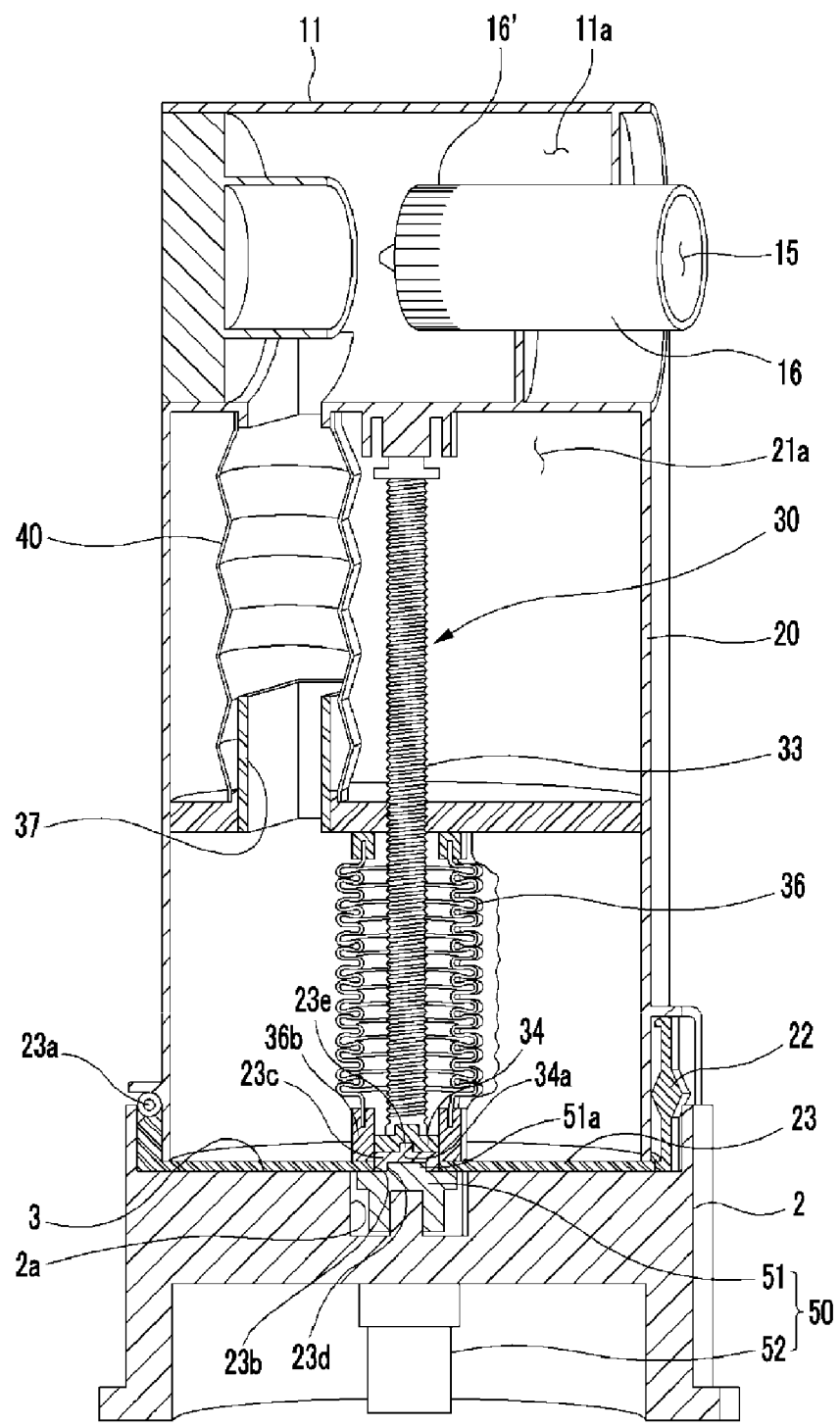
FIG. 4 is a cross section view of an exemplary dust collecting apparatus in another state.

FIG. 4 is a cross section view of an exemplary dust collecting apparatus in another state, illustrating a situation in which the compressing plate 32 is moved down to a position for dust compression.

In the dust collecting apparatus 100 with the construction illustrated in FIGS. 2 and 3, if dust is collected in the dust receiving portion 21, the rotational force of the motor 52 may be transmitted to the moveable member 33 by the motor 52, the axis coupling member 51, the second coupler 23c and the first coupler 34. As a result, the moveable member 33 may rotated. If the moveable member 33 is rotated, the compressing plate 32 may be moved upward or downward in accordance with the direction of rotation by the moveable member 33. If the compressing plate 32 is moved in a downward direction, dust in the dust receiving portion 21 may be compressed and reduced in size. At this time, the first and second dust passage forming members 40, 36 may be extended or retracted in accordance with the upward or downward movement of the compressing plate 32. More specifically, if the compressing plate 32 is moved in a downward direction, the first dust passage forming member 40 may be extended and the second dust passage forming member 36 may be retracted as shown in FIG. 4 so as not to interrupt, or limit any interruption to, the movement of the compressing plate 32.

Controlling the driving device 50 to move the compressing plate 32 in upward or downward direction may employ a variety of control methods, including, but not limited to: a method of moving the compressing plate 32 upward or downward continuously or periodically during an operation of the cleaner; a method of adding a separate motor driving switch (not illustrated) to enable a user to select upward and downward movement of the compressing plate 32; or a method of controlling based on a program having time series information regarding upward and downward movement of the compressing plate 32. Other suitable methods may be employed as well.

By way of example, a controlling program of the driving device 50 may cause the compressing plate 32 to move upward and downward once when a power line of a vacuum cleaner is connected to an external power terminal, and cause the compressing plate 32 to move upward and downward once when the cleaning operation is finished, the switch is turned off, and before the power line is disconnected from the external power terminal.

However, the control method of the driving device 50 to move the compressing plate 32 upward or downward is not limited to the examples explained above, and accordingly, many different forms of movement control may be employed appropriately.

The dust collecting apparatus 100 explained above, and more particularly, the dust colleting apparatus 100 capable of compressing dust, may be adapted to not only the centrifugal type vacuum cleaners such as canister or upright type vacuum cleaners, but also all the other forms of dust collecting apparatuses.

As explained above, a dust collecting apparatus compressing dust such as the one employed in a centrifugal type vacuum cleaner, may be capable of preventing dust of the dust receptacle 130 from diffusing to an area other than the dust receiving portion, by securely closing a dust passage between the dust outlet 13 of the centrifugal dust separating device 10 and the dust inlet 31 of the compressing plate 32.

Furthermore, since all the separated dusts may be collected in the dust receiving portion and compressed, dust compression efficiency may be improved and interval between emptying of the dust receptacle 130 may be lengthened. Additionally, since dust accumulating on the upper portion of the compressing plate 32 is prevented or limited, cleaning of the upper portion of the compressing plate 32 is unnecessary, and a more convenient vacuum cleaner may be provided.

Furthermore, since backflow of collected dust is prevented or limited, the centrifugal dust separating device 10 may enhance dust separation efficiency. Accordingly, grill blockage by the dust may be prevented, and dust ingression into the interior of the vacuum cleaner other than the dust receptacle 130 may also be prevented. As a result, possibility of malfunction of the vacuum cleaner may be reduced significantly.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dust collecting apparatus for compressing dust, comprising:
   a centrifugal dust separating device having a dust outlet;
   a compressing device formed inside a dust receptacle, and including a compressing plate in which a dust inlet is formed; and
   a dust passage forming member forming a dust passage between the dust outlet and the dust inlet.

2. The dust collecting apparatus for compressing dust of claim 1, wherein the dust passage forming member comprises an extensible and retractable tube.

3. The dust collecting apparatus for compressing dust of claim 1, wherein the dust passage forming member comprises an extensible and retractable corrugate tube.

4. The dust collecting apparatus for compressing dust of claim 1, wherein the dust passage forming member separates the dust passage from an interior space of the dust receptacle so that dust does not flow into the interior space.

5. The dust collecting apparatus for compressing dust of claim 1, wherein an interior space of the centrifugal dust separating device is separated from an interior space of the dust receptacle, and connected fluidly to a dust receiving portion of the dust receptacle device through the dust outlet.

6. The dust collecting apparatus for compressing dust of claim 1, wherein the compressing device further comprises a moveable member to move the compressing plate, and one end of the moveable member is rotatably secured to the centrifugal dust separating device.

7. The dust collecting apparatus for compressing dust of claim 6, wherein the dust receptacle comprises a dust discharge cover to move between a position to open a lower portion of the dust receptacle and a position to close the lower portion of the dust receptacle.

8. The dust collecting apparatus for compressing dust of claim 6, wherein the moveable member comprises a screw shaft.

9. The dust collecting apparatus for compressing dust of claim 1, further comprising a driving device to provide the compressing device with a driving force to move upward and downward;
   wherein the dust collecting apparatus is part of a vacuum cleaner.

10. The dust collecting apparatus for compressing dust of claim 9, wherein the driving device is controlled to move the compressing plate upward and downward during an operation of the vacuum cleaner at least one of: continuously, at predetermined intervals, and according to a user selection.

11. The dust collecting apparatus for compressing dust of claim 9, wherein the driving device is controlled to move the compressing plate upward and downward if a power line of the vacuum cleaner is connected to an external power terminal.

12. The dust collecting apparatus for compressing dust of claim 9, wherein the driving device is controlled to move the compressing plate upward and downward between when the vacuum cleaner stops operation and when a power line of the vacuum cleaner is disconnected from an external power terminal.

13. The dust collecting apparatus for compressing dust of claim 9, wherein the driving device is controlled to move the compressing plate upward and downward if the power line of a vacuum cleaner is connected to an external power terminal,
   to stop moving the compressing plate upward and downward if an operating switch of the vacuum cleaner is turned on, and
   to move the compressing plate upward and downward if the operating switch is turned off or the power line is disconnected from the external power terminal.

* * * * *